US007870076B2

(12) United States Patent  
Malcolm

(10) Patent No.: US 7,870,076 B2  
(45) Date of Patent: Jan. 11, 2011

(54) METHOD AND AN APPARATUS TO PROVIDE INTEROPERABILITY BETWEEN DIFFERENT PROTECTION SCHEMES

(75) Inventor: David H. Malcolm, Somerville, MA (US)

(73) Assignee: Red Hat, Inc., Raleigh, NC (US)

( * ) Notice: Subject to any disclaimer, the term of this patent is extended or adjusted under 35 U.S.C. 154(b) by 353 days.

(21) Appl. No.: 11/712,285

(22) Filed: Feb. 27, 2007

(65) Prior Publication Data

US 2008/0208755 A1 Aug. 28, 2008

(51) Int. Cl.  
*G06F 21/00* (2006.01)

(52) U.S. Cl. ........................................ 705/59; 380/232

(58) Field of Classification Search .................... 705/59  
See application file for complete search history.

(56) References Cited

U.S. PATENT DOCUMENTS

| | | | | |
|---|---|---|---|---|
| 6,094,684 | A * | 7/2000 | Pallmann | 709/227 |
| 6,226,618 | B1 * | 5/2001 | Downs et al. | 705/1 |
| 6,885,748 | B1 * | 4/2005 | Wang | 380/201 |
| 7,568,105 | B2 * | 7/2009 | Collens et al. | 713/176 |
| 2002/0114462 | A1 * | 8/2002 | Kudo et al. | 380/203 |
| 2003/0007646 | A1 * | 1/2003 | Hurst et al. | 380/285 |
| 2003/0103528 | A1 * | 6/2003 | Kawaguchi et al. | 370/468 |
| 2003/0174896 | A1 * | 9/2003 | Ridge | 382/239 |
| 2003/0182156 | A1 * | 9/2003 | Bock | 705/1 |
| 2004/0049694 | A1 * | 3/2004 | Candelore | 713/200 |
| 2004/0103011 | A1 * | 5/2004 | Hatano et al. | 705/4 |
| 2004/0151311 | A1 * | 8/2004 | Hamberg et al. | 380/44 |
| 2004/0255115 | A1 * | 12/2004 | DeMello et al. | 713/156 |
| 2005/0021539 | A1 * | 1/2005 | Short et al. | 707/100 |
| 2005/0152548 | A1 * | 7/2005 | Wasilewski | 380/216 |
| 2005/0192904 | A1 * | 9/2005 | Candelore | 705/51 |
| 2005/0228752 | A1 * | 10/2005 | Konetski et al. | 705/51 |
| 2006/0004770 | A1 * | 1/2006 | Nakano et al. | 707/10 |
| 2006/0153379 | A1 * | 7/2006 | Candelore et al. | 380/216 |
| 2007/0022306 | A1 * | 1/2007 | Lindsley | 713/193 |
| 2008/0086757 | A1 * | 4/2008 | Pestoni | 726/2 |
| 2008/0228578 | A1 * | 9/2008 | Mashinsky | 705/14 |
| 2009/0276619 | A1 * | 11/2009 | Collens et al. | 713/153 |

FOREIGN PATENT DOCUMENTS

WO WO 0239398 A1 * 5/2002

OTHER PUBLICATIONS

Wilson, Tracy V. "How Streaming Video and Audio Work." Oct. 12, 2007. All pages. HowStuffWorks.com. <http://computer.howstuffworks.com/internet/basics/streaming-video-and-audio.htm>.*

* cited by examiner

*Primary Examiner*—Evens J Augustin  
*Assistant Examiner*—Calvin K Cheung  
(74) *Attorney, Agent, or Firm*—Blakely, Sokoloff, Taylor & Zafman LLP

(57) ABSTRACT

Some embodiments of a method and an apparatus to provide interoperability between different digital content protection schemes have been presented. In one embodiment, a first copy of digital content encrypted using a first protection scheme is received from a user. In response to a request from the user, it is verified that the user is a rightful owner of the first copy without decrypting the first copy. A second copy of the digital content encrypted using a second protection scheme is sent to the user if the user is a rightful owner of the first copy.

16 Claims, 6 Drawing Sheets

METHOD AND AN APPARATUS TO PROVIDE INTEROPERABILITY BETWEEN DIFFERENT PROTECTION SCHEMES

TECHNICAL FIELD

Embodiments of the present invention relate to digital content, and more specifically to providing interoperability for digital content encrypted using different protection schemes.

BACKGROUND

As digital technology advances, more and more content is digitized and distributed in various digital formats, such as music, motion pictures, television shows, books, etc. One important characteristic of digital content is the ease of making a copy of the digital content without impeding the quality of the copy of the digital content. As a result, copyright infringement becomes a serious problem with digital content. Many vendors of digital content tackle the problem by employing various digital right management (DRM) schemes to restrict copying and/or modifying of digital content. Some more restrictive DRM schemes attempt to limit the number of times that a copy of digital content can be played.

Currently, some conventional DRM schemes are compatible with only certain types of digital media rendering devices (also known as digital media players). As such, an audio file encrypted using a particular DRM scheme may be playable using digital music players made by a certain manufacturer. For instance, songs purchased from iTunes® store operated by Apple, Inc. of California are playable by only digital music players made by Apple, Inc. of Cupertino, Calif. (e.g., iPod®), but not digital music players made by other manufacturers. Thus, a consumer who has legally purchased a digital copy of a song protected by a DRM scheme compatible with one digital music player may not play the digital copy using another digital music player if the two digital music players support different DRM schemes. Such inoperability between different DRM schemes causes great inconvenience to the consumer when the consumer switches between digital music players supporting different DRM schemes.

DESCRIPTION OF THE DRAWINGS

The present invention is illustrated by way of example, and not by way of limitation, in the figures of the accompanying drawings and in which.

DETAILED DESCRIPTION

Figure 1:
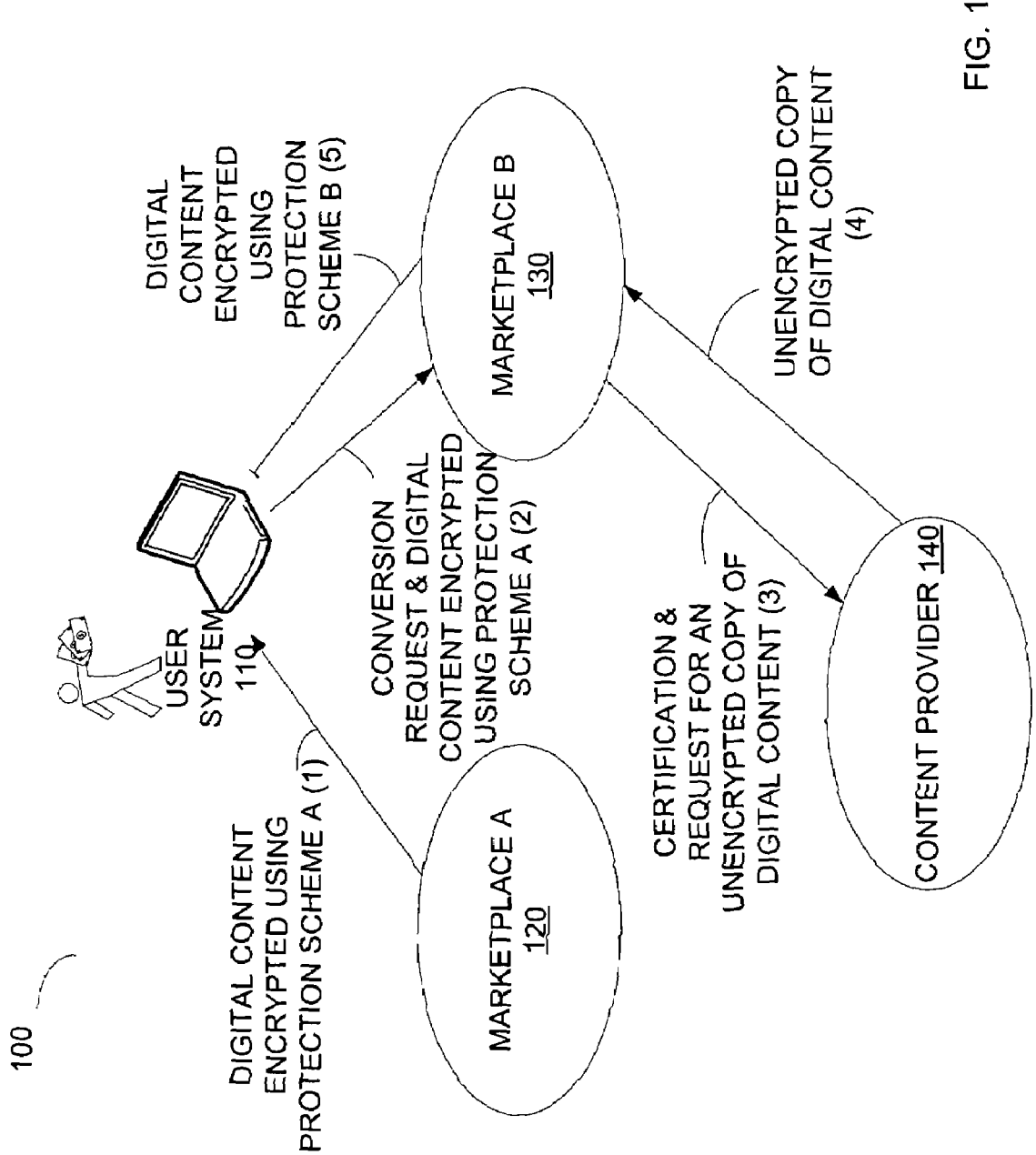
FIG. 1 illustrates one embodiment of a system in which embodiments of the present invention may be implemented.

Described herein are some embodiments of a method and an apparatus to provide interoperability between different digital content protection schemes. In one embodiment, a first copy of digital content encrypted using a first protection scheme is received from a user. In response to a request from the user, it is verified that the user is a rightful owner of the first copy without decrypting the first copy. A second copy of the digital content encrypted using a second protection scheme is sent to the user if the user is a rightful owner of the first copy.

Content as used herein broadly refers to subject matter of literary and/or artistic work, such as music, motion pictures, television shows, books, etc. Content in a digitized form is referred to as digital content. To protect the copyright of digital content, the digital content may be encrypted using a protection scheme, which may include one of the many digital right management (DRM) schemes developed and/or promulgated by various vendors of digital content. A protection scheme is a technological measure used to control access to the digital content, such as to restrict and/or limit reproduction, distribution, modification, and/or rendering of the digital content. For example, one protection scheme may lock the digital content to prevent copying of the digital content without approval by the copyright holder. Another protection scheme may limit the number of times the digital content may be rendered (such as the number of times the digital content may be performed and/or displayed). In general, a protection scheme includes a methodology to scramble and unscramble data of the digital content. In some embodiments, a copy of digital content encrypted using a protection scheme includes two parts. The first part contains metadata of the copy, which provides information on the copy of the digital content, such as the creator of the copy, an original content provider of the digital content, etc. The metadata may not be scrambled. The second part contains the data of the digital content, which is scrambled according to the methodology.

A rightful owner of a copy of digital content as described herein refers to a person and/or an entity that has legally obtained the copy of the digital content and is in legal possession of the copy of the digital content. For example, someone who has purchased a copy of the digital content from a marketplace licensed by the copyright holder of the content (i.e., the content provider) is a rightful owner of the copy of the digital content. In contrast, someone who has downloaded or made a copy of the digital content without prior authorization from the copyright holder is not a rightful owner of the copy of the digital content.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates one embodiment of a system in which embodiments of the present invention may be implemented. The system 100 includes a user system 10, marketplace A 120, marketplace B 130, and a content provider 140. The content provider 140 provides content, such as music, motion pictures, television shows, etc. The content provider 140 may have business relationships established with marketplace A 120 and marketplace B 130 to allow marketplace A 120 and marketplace B to market and/or sell the content in digitized form (hereinafter, referred to as "the digital content"). To protect copyright of the digital content, marketplace A 120 and marketplace B 130 encrypt the digital content using different protection schemes. For instance, marketplace A 120 and marketplace B 130 may encrypt the digital content using protection scheme A and protection scheme B, respectively. A user 110 may purchase encrypted copies of the digital content from either marketplace A 120 and/or marketplace B 130 using the user system 110. The user system 10 may include a client machine, such as a desktop personal computer (PC), a laptop PC, a personal digital assistant (PDA), a mobile telephone, a digital media player (e.g., a MP3 (Motion Picture Experts Group layer 3) player), etc.

Note that marketplace B 130 may not be able to decrypt the digital content encrypted using protection scheme A. Likewise, marketplace A 120 may not be able to decrypt the digital content encrypted using protection scheme B. The protection schemes A and B may be proprietary. Furthermore, copies of digital content purchased from marketplace A 120 may be limited to being rendered by a first type of media players, while copies of digital content purchased from marketplace B 130 may be limited to being rendered by a second type of media players. Thus, the second type of media players cannot render the copies of digital content from marketplace A 120. Likewise, the first type of media players cannot render the copies of digital content from marketplace B 130. Such limitation poses great inconvenience to the user when the user desires to switch from the first type of media players to the second type of media players because the user may not be able to play the copy of the digital content obtained from marketplace A using the second type of media players.

To provide interoperability between protection schemes A and B, marketplace B 130 may provide a copy of the digital content encrypted using protection scheme B to the user system 110 upon successful verification that the user is a rightful owner of another copy of the digital content encrypted using protection scheme A. One example is discussed in details below to illustrate the above concept.

In some embodiments, the user is a rightful owner of a copy of digital content because the user system 110 has legally obtained the copy of digital content (e.g., an audio file of a song) encrypted using protection scheme A (1) from marketplace A 120. For instance, the user purchases the copy of the digital content from marketplace A 120. As discussed above, the copy of the digital content encrypted using protection scheme A (1) is playable by the first type of media players, but not the second type of media players. Later, the user may desire to play the copy of the digital content using the second type of media players. The user system 110 may send a conversion request and the digital content encrypted using protection scheme A (2) to marketplace B 130 to request marketplace B 130 to convert the encryption of the copy of the digital content to protection scheme B. Alternatively, the user may access a website hosted by marketplace B 130 to submit the conversion request and upload the copy of the digital content encrypted using protection scheme A (2) via a network access application (e.g., an Internet browser). For example, the user may manually enter a universal resource locator (URL) of the website in the browser. Then the user may actuate some graphical user interface controls provided by the website to submit the conversion request and to upload the copy (2).

Although marketplace B 130 may not be able to decrypt the copy of digital content encrypted using protection scheme A, marketplace B 130 may perform various operations to generate a second copy of the digital content encrypted using protection scheme B. First, marketplace B 130 verifies that the user is a rightful owner of the copy of the digital content encrypted using protection scheme A, as will be discussed in more detail below. In some embodiments, marketplace B 130 generates a certification to certify that the user is a rightful owner of the copy of the digital content if the verification is successful. Then marketplace B 130 may determine the original content provider of the digital content from the metadata of the copy of the digital content. The metadata of the copy of the digital content is not encrypted, and thus, marketplace B 130 is able to examine the metadata. Then marketplace B 130 may send the certification and a request for an unencrypted copy of the digital content (3) to the original content provider 140. In an alternate embodiment, marketplace B 130 and the content provider 140 may have agreed that if marketplace B 130 already has an existing unencrypted copy of the digital content, marketplace B 130 may use the existing unencrypted copy. In other words, marketplace B 130 may not have to request another unencrypted copy of the digital content from the content provider 140.

Alternatively, marketplace B 130 may find another content provider that legally resells the digital content and may send the certification and a request for an unencrypted copy of the digital content to this content provider. Note that marketplace B 130 and/or the user may or may not have to pay for the unencrypted copy depending on the business arrangements established between marketplace B 130, the user, and the content provider 140 (e.g., contract terms, licensing agreements, etc.).

In response to the certification and the request (3) from marketplace B 130, the content provider 140 sends an unencrypted copy of the digital content (4) to marketplace B 130. The content provider 140 may keep a record of the requests sent by marketplace B 130 for various purposes, such as marketing and auditing. Then marketplace B 130 encrypts the unencrypted copy to generate the second copy of the digital content using protection scheme B. As mentioned above, the second type of media players support protection scheme B, and thus, the second copy of the digital content encrypted using protection scheme B is playable on the second type of media players. Marketplace B 130 sends the second copy encrypted using protection scheme B (5) to the user system 110. From the perspective of the user, marketplace B 130 has "converted" the copy of the digital content from protection scheme A to protection scheme B, and thus, the digital content previously obtained by the user is not limited to being played by the first type of media players. In other words, the digital content has become "interoperable" between the protection schemes A and B from the perspective of the user.

Note that marketplace B 130 may have established business relationships with more than one content provider, as well as procedures for transferring digital content between different protection schemes, such as auditing, making payments, etc. The user may or may not have to pay for the "conversion" of the copy of the digital content, depending on the particular business arrangements established.

Figure 2A:
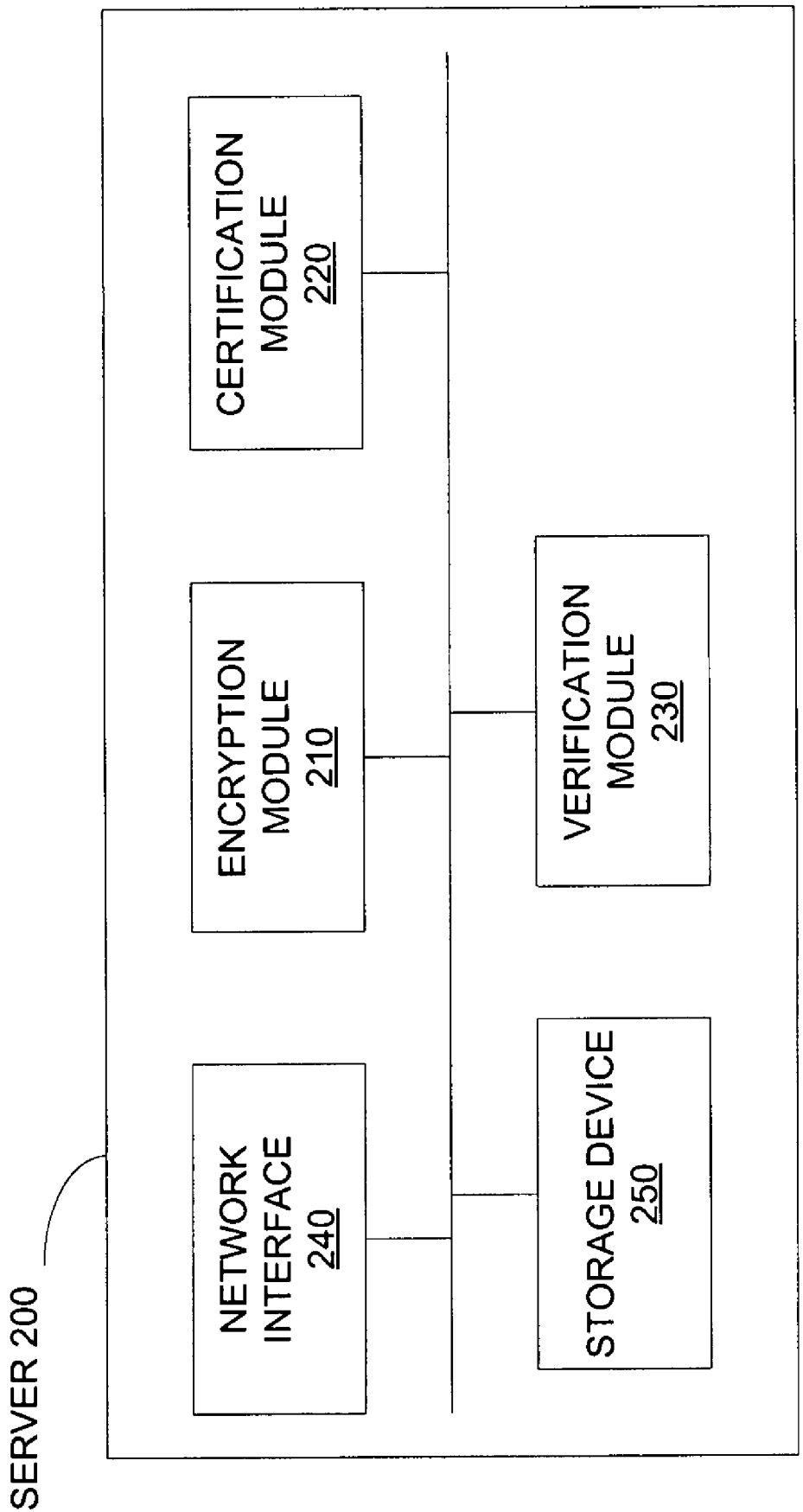
FIG. 2A illustrates a functional block diagram of one embodiment of a server.

FIG. 2A illustrates a functional block diagram of one embodiment of a server usable by marketplace B 130 in FIG. 1. The server 200 may be implemented on a computing device, such as the one described with reference to FIG. 4. The server 200 includes an encryption module 210, a certification module 220, a verification module 230, a network interface 240, and a storage device 250, which are operatively coupled to each other.

In some embodiments, the network interface 240 communicatively couples the server 200 to a network, which may include a local area network (LAN), a wide area network (WAN), the Internet, etc. Via the network, the network interface 240 receives a user request and a copy of digital content encrypted using a first protection scheme. The user request includes a request to the server 200 to convert the copy of digital content to a second protection scheme. In response to the request, the verification module examines the copy of digital content to verify that the user is a rightful owner of the copy. As mentioned above, the metadata of the digital content encrypted using protection scheme A may not be encrypted. The metadata contains information about the copy of the digital content, such as the creator of the copy, the original content provider of the digital content, etc. Thus, the verification module 230 may examine the metadata of the copy to determine if a legitimate marketplace has created the copy. If so, the user may have legally obtained the copy and thus, may be a rightful owner of the copy. Otherwise, the user has likely made the copy from another copy of the digital content without prior approval from the original content provider of the digital content, and thus, may not be a rightful owner of the copy. If the verification module 230 fails to successfully verify that the user is a rightful owner of the copy, then the verification module 230 may cause the server 200 to deny the user request.

If the verification module 230 successfully verifies that the user is a rightful owner of the copy, the verification module 230 causes the certification module 220 to generate a certificate for the user and the copy of the digital content. Further, the verification module 230 may examine the metadata of the copy to determine the original content provider of the digital content and send a request with the certificate to the original content provider to request an unencrypted copy of the digital content. Alternatively, the verification module 230 may examine the metadata of the copy to determine what the digital content is and find a content provider that resells the digital content. Then the verification module 230 may send a request with the certificate to this content provider to request or to purchase an unencrypted copy of the digital content.

In response to the request, the content provider sends an unencrypted copy of the digital content to the server 200. The encryption module 210 in the server 200 encrypts the unencrypted copy using the second protection scheme to generate a second copy of the digital content. Then the network interface 240 sends the second copy of the digital content via the network to the user. The user may receive the second copy of the digital content at a client machine communicatively coupled to the network. One embodiment of a client machine is described below.

Figure 2B:
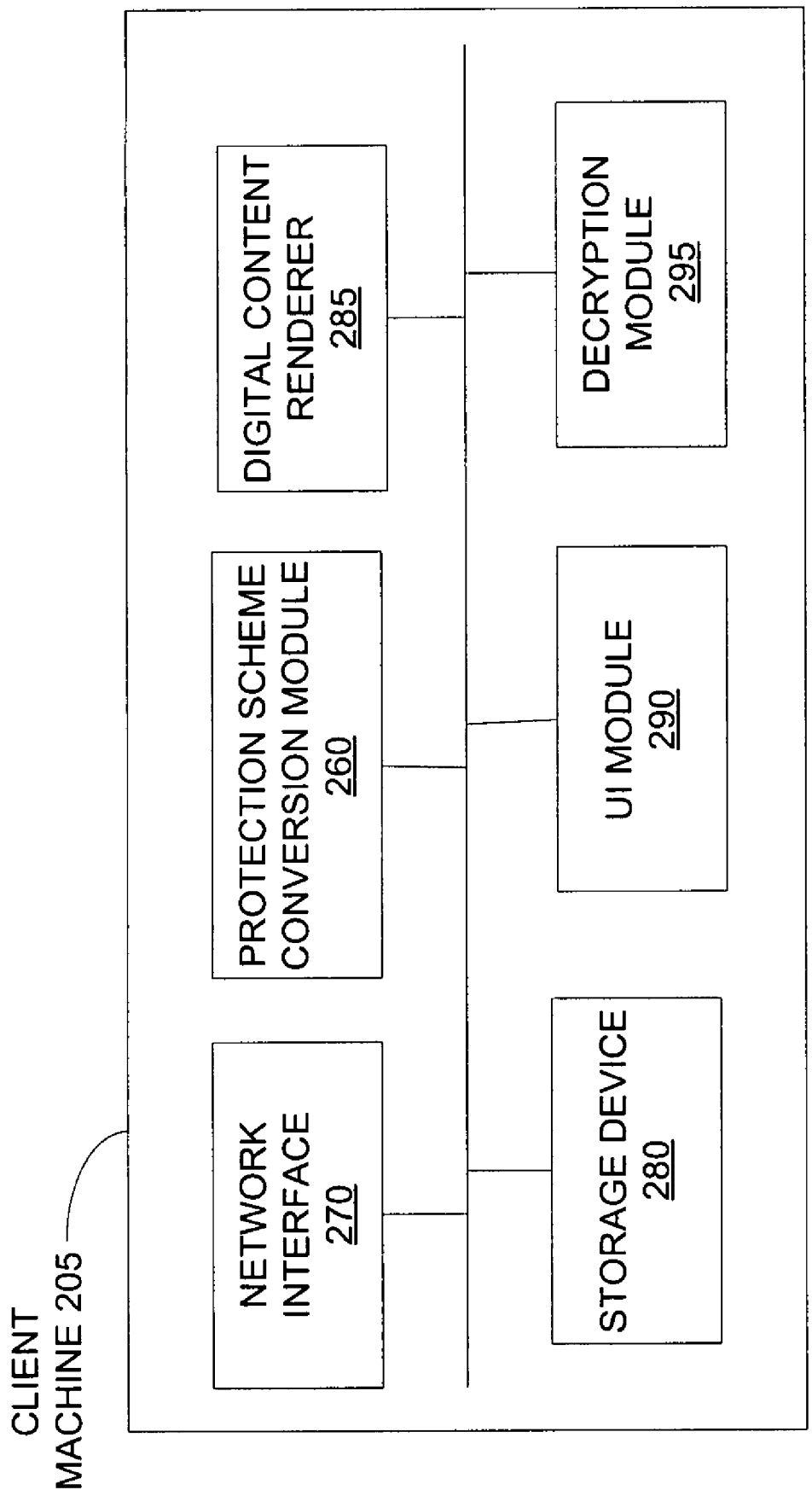
FIG. 2B illustrates a functional block diagram of one embodiment of a client machine.

FIG. 2B illustrates a functional block diagram of one embodiment of a client machine usable to implement the user system 110 in FIG. 1. The client machine 205 may be implemented on a device having networking and computing capability, such as a desktop PC, a laptop PC, a cellular telephone, a media player (e.g., a digital music player), etc. The client machine 205 includes a network interface 270, a protection scheme conversion module 260, a storage device 280, a digital content renderer 285, a user interface (UI) module 290, and a decryption module 295, which are operatively coupled to each other. The UI module 290 generates a UI to interact with a user. The UI may include graphical UI (GUI), softkeys, etc. The storage device 280 stores digital content, such as audio data, video data, etc. The network interface 270 communicatively couples the client machine 205 to a server (e.g., the server 200 in FIG. 2A) via a network, which may include a LAN, a WAN, the Internet, etc. The decryption module 295 is operable to decrypt digital content encrypted using a predetermined protection scheme (hereinafter, referred to as protection scheme B). But the decryption module 295 may not support other protection schemes. The digital content renderer 285 may be operable to render decrypted digital content. To further illustrate various operations of the client machine 205, one example is described in detail below.

Suppose the storage device 280 stores a copy of digital content encrypted using a protection scheme not supported by the decryption module 295 (hereinafter, referred to as protection scheme A). The user may wish to convert the copy of digital content to be encrypted using the supported protection scheme, protection scheme B, in order to render the digital content using the client device 205. The user may submit a request to the client machine 205 via the UI generated by the UI module 290.

In response to the user request, the protection scheme conversion module 260 generates a conversion request. Then the network interface 270 sends the conversion request and the copy of the digital content encrypted using protection scheme A to the server. The server may verify whether the user is a rightful owner of the copy of the digital content encrypted using protection scheme A. Upon successful verification, the server may obtain an unencrypted copy of the digital content and encrypt the unencrypted copy using protection scheme B to generate a second copy of the digital content. Then the server sends the second copy of the digital content to the client machine 205. Details of some embodiments of the server and the operations performed by the server have been described above.

After receiving the second copy of the digital content, the decryption module 295 may decrypt the second copy of the digital content. The digital content renderer 285 may render the decrypted copy of the digital content. Alternatively, the client machine 205 may transfer the second copy of the digital content to a digital media player detachable from the client machine 205 (e.g., a digital music player). The digital media player may decrypt and render the second copy of the digital content.

In some embodiments, the protection scheme conversion module 260 may delete or remove the copy of the digital content encrypted using protection scheme A from the storage device 280 after receiving the second copy of the digital content from the server. From the user's perspective, the encryption of the copy of the digital content appears to have been converted from protection scheme A to protection scheme B.

Alternatively, the protection scheme conversion module 260 may hide the copy of the digital content encrypted using protection scheme A from the user. For instance, when the UI module 290 generates a list of available digital content in the client machine 205, the protection scheme conversion module 260 may cause the UI module 290 not to display an identifier the copy of the digital content encrypted using protection scheme A (e.g., a file name of the copy) in the list. In response to an undo request from the user, the protection scheme conversion module 260 may remove or hide the second copy of the digital content and allow the user to access the copy encrypted using protection scheme A again.

If, for any reason, the server does not return the second copy of the digital content encrypted using protection scheme B to the client machine 205, the protection scheme conversion module 260 may cause the UI module 290 to generate an error message to notify the user that the digital content cannot be converted. Further, the protection scheme conversion module 260 may not delete or hide the copy of the digital content encrypted using protection scheme A under such circumstances.

Figure 3A:
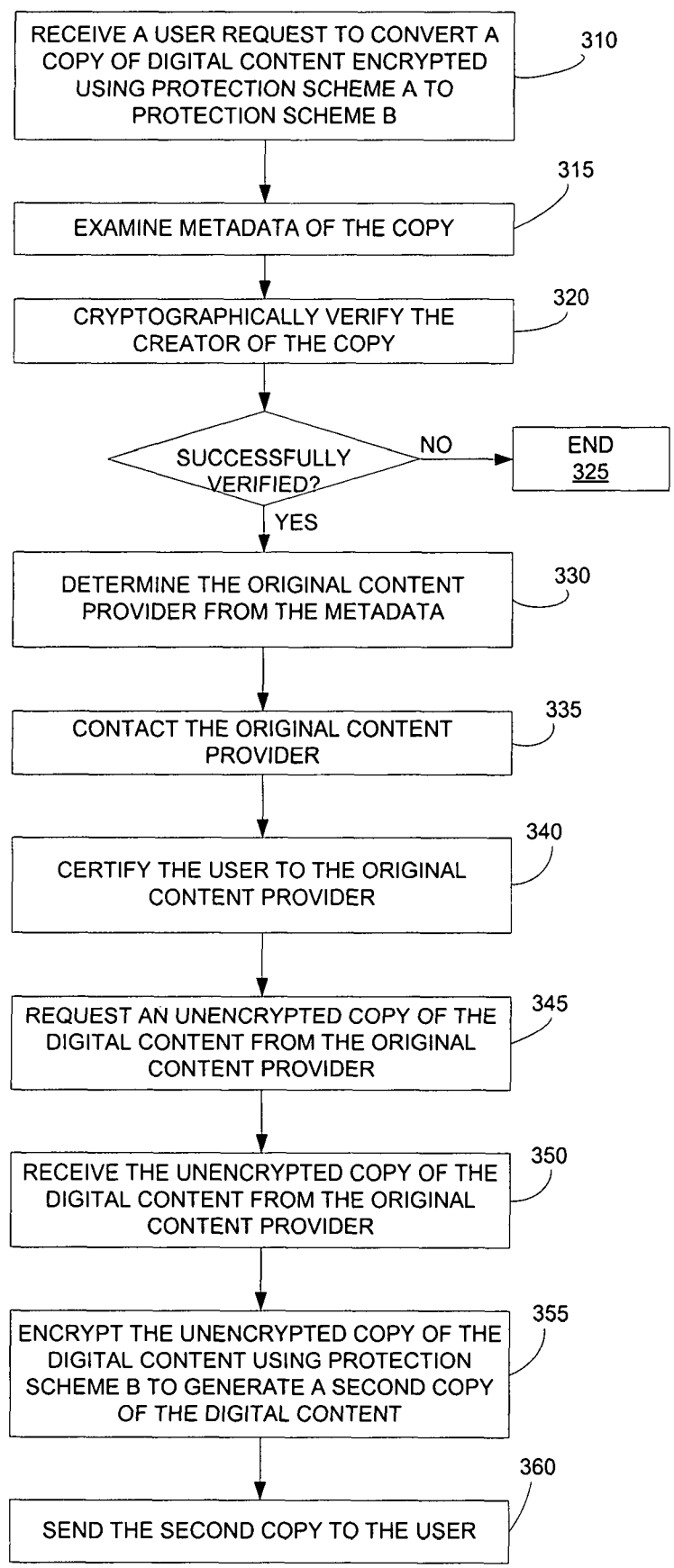
FIG. 3A illustrates a flow diagram of one embodiment of a process to provide interoperability between different protection schemes.

FIG. 3 illustrates a flow diagram of one embodiment of a process to provide interoperability between different digital content protection schemes. The process may be performed by processing logic that may comprise hardware (e.g., circuitry, dedicated logic, programmable logic, microcode, etc.), software (such as instructions run on a processing device), firmware, or a combination thereof. For example, the server 200 in FIG. 2A may perform at least part of the process. Referring to FIG. 3, processing logic receives a user request to convert a copy of digital content encrypted using protection scheme A to protection scheme B (processing block 310). Processing logic examines the metadata of the copy of digital content (processing block 315). In some embodiments, the metadata includes unencrypted tags containing information about the copy, such as an album name, an artist name, the creator of the copy of the digital content, etc. Then processing logic may cryptographically verify the creator of the copy (processing block 320). One embodiment of the encryption and verification is described in detail below.

If processing logic cannot successfully verify the creator of the copy, then it is unlikely that the user has legally obtained the copy. Thus, processing logic ends the process (processing block 325). If processing logic has successfully verified the creator of the copy, then processing logic proceeds to generate a second copy of the digital content encrypted using protection scheme B. In some embodiments, processing logic determines the original content provider from the metadata (processing block 330). Then processing logic contacts the original content provider (processing block 335). Processing logic certifies to the original content provider that the user has legally obtained a copy of the digital content encrypted using encryption scheme A (processing logic 340). Processing logic further requests an unencrypted copy of the digital content from the original content provider (processing block 345). In response to the request and the certification, the original content provider sends an unencrypted copy of the digital content to processing logic.

Processing logic receives the unencrypted copy of the digital content from the original content provider (processing block 350). Then processing logic encrypts the unencrypted copy using protection scheme B to generate a second copy of the digital content (processing block 355). Processing logic sends the second copy of the digital content to the user (processing block 360). Thus, processing logic provides the second copy of the digital content to the user without decrypting the copy of the digital content from the user. However, from the perspective of the user, the copy of the digital content has been "converted" from protection scheme A to protection scheme B.

To further illustrate the encryption and verification process, one example is described in detail below. In one embodiment, the creator (e.g., marketplace A 120 in FIG. 1) of a copy of digital content generates two key pairs, one pair for signing data, and another pair for encrypting data. Thus, there may be at least four items of data. The key pairs may be generated according to various security schemes. For example, the key pair for signing the data may be generated using digital signature security standard (DSS) while the other key pair for encrypting the data may be generated using RSA (Rivest, Shamir, Adleman) encryption. The creator may have first used the creator's private encryption key to encrypt the digital content (e.g., a song). Then the encrypted content (e.g., audio data of the song) is prefixed with unencrypted metadata, resulting in a block of data partially in plain text and partially encrypted. The unencrypted metadata may include information about the digital content (e.g., artist, song name, album, genre, duration, etc.). One example of the data is shown in FIG. 3B.

Figure 3B:
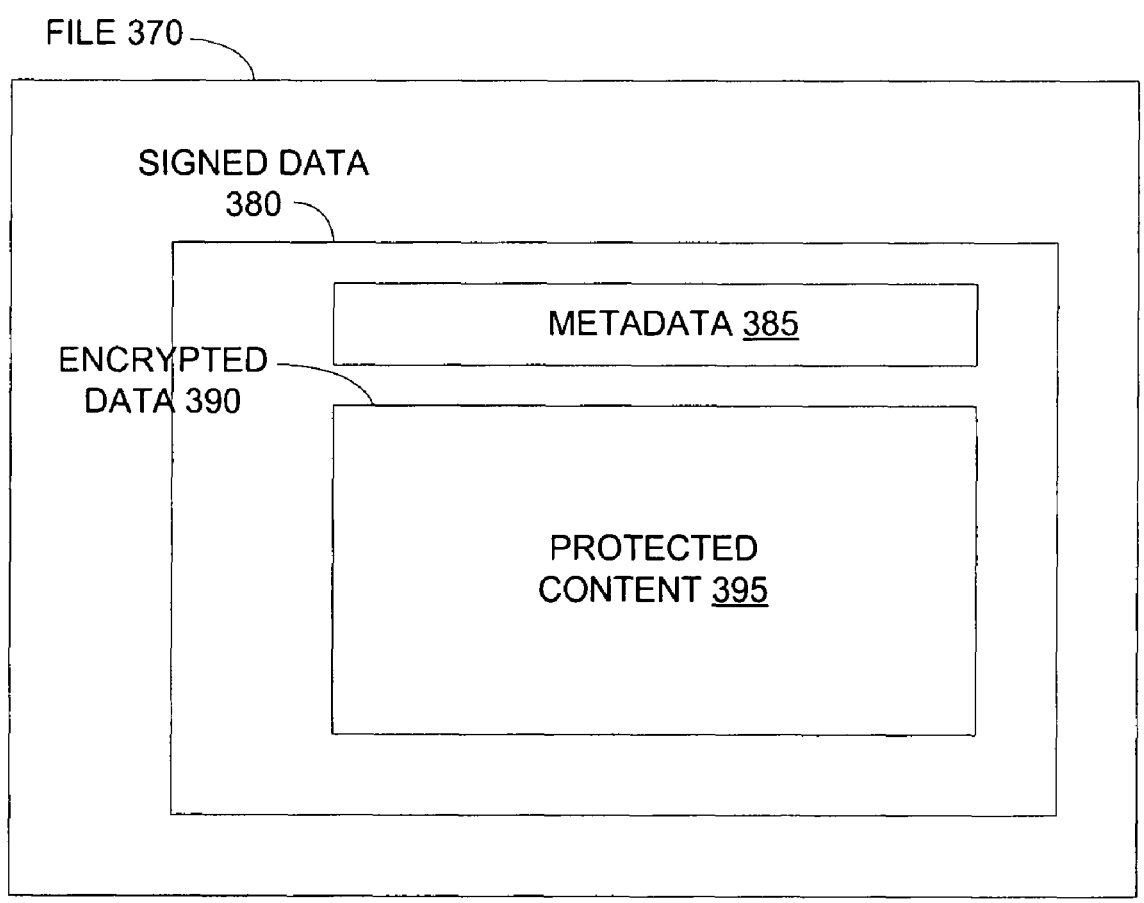
FIG. 3B shows one embodiment of a file containing digital content.

FIG. 3B shows one embodiment of a file 370 containing digital content protected by an exemplary protection scheme. Within the file 370, there is a block of data 380 having unencrypted metadata 385 and encrypted data 390. The metadata 385 may include information such as content title (e.g., song name, motion picture name, etc.), artist name, publisher name, etc. The encrypted data 390 includes the protected content 395, such as audio data of a song, video data of a motion picture, etc. The creator of the file 370 may then cryptographically sign the block of data 380 with a digital signature using the private signing key. To play the encrypted content 395 in the file 370, a digital media player uses the decryption half of the encryption key pair to decrypt the protected content 395 stored within the file 370.

As such, a second marketplace that provides encryption conversion service (e.g., marketplace B 130 in FIG. 1), may read the metadata 385 in the file 370 to verify from the digital signature that the creator of the file 370 is indeed a legitimate marketplace (e.g., marketplace A 120 in FIG. 1), without having to decrypt the content 395. The second marketplace may also identify the encrypted data in question by using the metadata 385. For example, the metadata in an audio file might contain tags identifying the artist, the album, the song name, track number, duration, etc. The second marketplace may use a successful verification to assure the content provider that the user is a rightful owner of the file 370 attempting to transfer the content 395 to a desired protection scheme. Having been assured by the second marketplace, the content provider may send an unencrypted copy of the digital content to the second marketplace so that the second marketplace may encrypt the unencrypted copy using the desired protection scheme. Alternatively, the second marketplace may already have an unencrypted copy of the digital content. Thus, the second marketplace may not have to request an unencrypted copy from the content provider. The second marketplace may encrypt the unencrypted copy using the desired protection scheme upon successful verification of the user's rightful ownership of the file 370.

In sum, the above exemplary protection scheme allows the second marketplace to read the metadata 385 and to ensure that the file 370 has been created by the legitimate marketplace. One should appreciate that there may be variations to the above scheme in other embodiments, such as a different encryption scheme or a different digital signing standard may be used.

Figure 4:
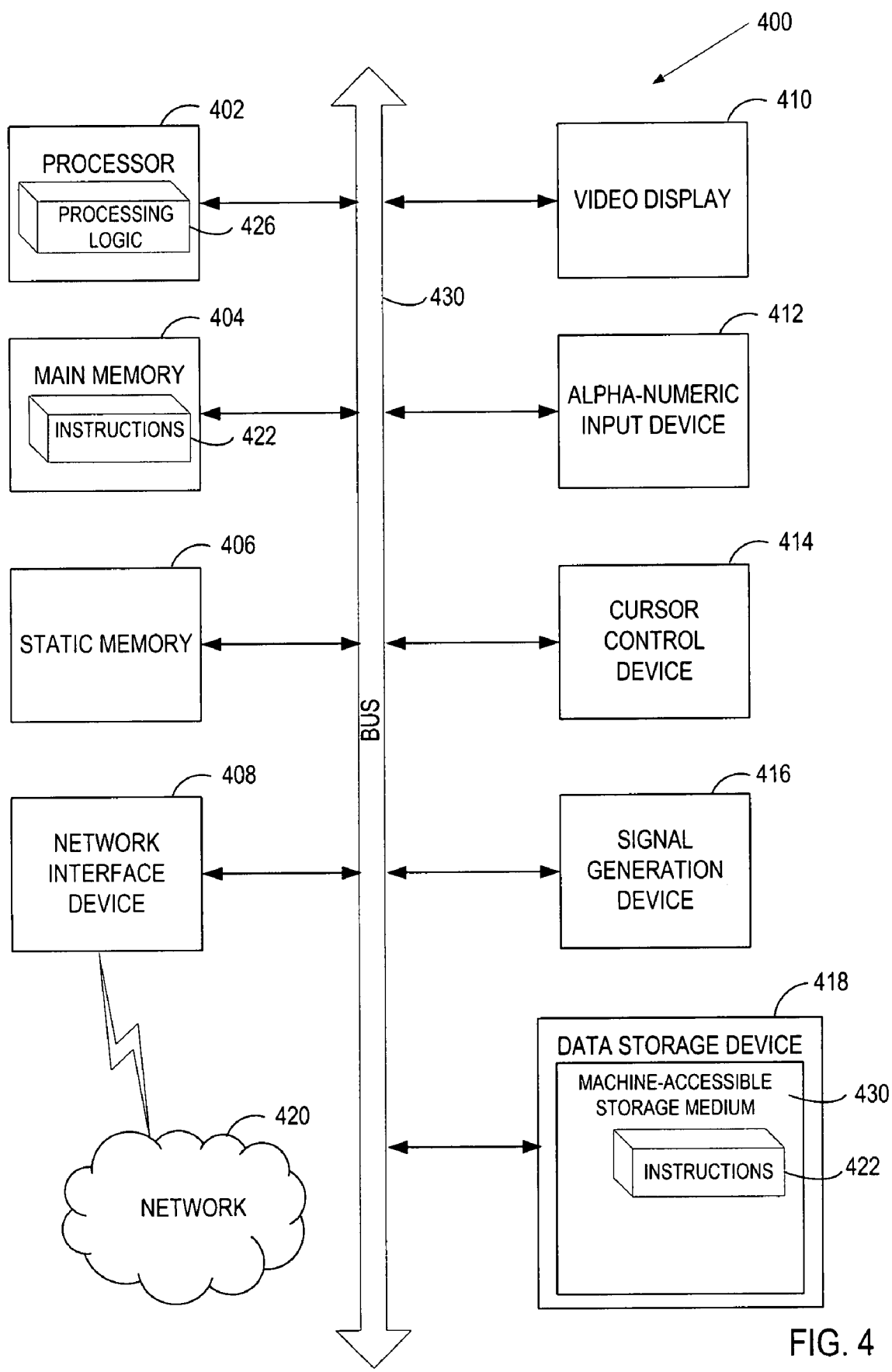
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of a method and an apparatus to provide interoperability between different digital content protection schemes have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a server, a first copy of digital media content encrypted using a first encryption scheme from a user;
   in response to a request from the user, verifying that the user is a rightful owner of the first copy without decrypting the first copy received by the network interface;
   obtaining an unencrypted copy of the digital media content;
   encrypting the unencrypted copy of the digital media content using a second encryption scheme to generate a second copy of the digital media content, wherein the second copy is encrypted without using the first copy received by the server; and
   providing the second copy of the digital media content to the user if the user is verified to be a rightful owner of the first copy.

2. The method of claim 1, further comprising
   certifying to a content provider that the user is a rightful owner of the first copy.

3. The method of claim 1, further comprising:
deleting the first copy of the digital media content after the second copy has been provided to the user.

4. The method of claim 1, further comprising:
withholding the first copy from the user after the second copy has been provided to the user; and
returning the first copy to the user in response to a second request from the user to undo conversion of encryption of the digital media content from the first encryption scheme to the second encryption scheme.

5. The method of claim 1, wherein the first copy includes unencrypted metadata and encrypted data of the digital media content, the first copy being signed with a digital signature, wherein verifying that the user is a rightful owner comprises:
examining the metadata of the first copy of the digital media content;
determining a creator of the first copy of the digital media content from the metadata; and
checking if the digital signature corresponds to the creator of the first copy of the digital media content.

6. The method of claim 1, further comprising:
examining metadata of the first copy of the digital media content;
determining an original content provider of the digital media content using the metadata; and
requesting the unencrypted copy of the digital media content from the original content provider if the user is a rightful owner of the first copy.

7. The method of claim 1, wherein the digital media content comprises audio data.

8. The method of claim 1, wherein the digital media content comprises video data.

9. A non-transitory machine-readable medium that provides instructions that, when executed by a processor, will cause the processor to perform operations comprising:
receiving causing a first copy of digital media content encrypted using a first encryption scheme from a user;
in response to a request from the user, verifying that the user is a rightful owner of the first copy without decrypting the first copy received by the network interface;
obtaining an unencrypted copy of the digital media content;
encrypting the unencrypted copy of the digital media content using a second encryption scheme to generate a second copy of the digital media content, wherein the second copy is encrypted without using the received first copy; and
providing the second copy of the digital media content to the user if the user is verified to be a rightful owner of the first copy.

10. The non-transitory machine-readable medium of claim 9, further comprising:
certifying to a content provider that the user is a rightful owner of the first copy.

11. The non-transitory machine-readable medium of claim 9, wherein the operations further comprise:
deleting the first copy of the digital media content after the second copy has been provided to the user.

12. The non-transitory machine-readable medium of claim 9, wherein the operations further comprise:
withholding the first copy from the user after the second copy has been provided to the user; and
returning the first copy to the user in response to a second request from the user to undo conversion of encryption of the digital media content from the first encryption scheme to the second encryption scheme.

13. The non-transitory machine-readable medium of claim 9, wherein the first copy includes unencrypted metadata and encrypted data of the digital media content, the first copy being signed with a digital signature, wherein verifying that the user is a rightful owner comprises:
examining the metadata of the first copy of the digital media content;
determining a creator of the first copy of the digital media content from the metadata; and
checking if the digital signature corresponds to the creator of the first copy of the digital media content.

14. The non-transitory machine-readable medium of claim 9, wherein the operations further comprise:
examining metadata of the first copy of the digital media content;
determining an original content provider of the digital media content using the metadata; and
requesting the unencrypted copy of the digital media content from the original content provider if the user is a rightful owner of the first copy.

15. The non-transitory machine-readable medium of claim 9, wherein the digital media content comprises audio data.

16. The non-transitory machine-readable medium of claim 9, wherein the digital media content comprises video data.

* * * * *